US Patent Number: 5,002,133
Date of Patent: Mar. 26, 1991
Inventor: Jean-Jacques Rybak, Gournay en Bray, France
Assignee: Nemisis, Gournay En Bray, France

[54] HORSESHOE

[21] Appl. No.: 269,680
[22] PCT Filed: Jan. 22, 1988
[86] PCT No.: PCT/FR88/00036
§ 371 Date: Sep. 22, 1988
§ 102(e) Date: Sep. 22, 1988
[87] PCT Pub. No.: WO88/05260
PCT Pub. Date: Jul. 28, 1988

[30] Foreign Application Priority Data

Jan. 22, 1987 [FR] France ............... 87 00732

[51] Int. Cl.⁵ ............... A01L 1/02
[52] U.S. Cl. ............... 168/4; 168/24
[58] Field of Search ............... 168/4, 14, 24, 26, 28

[56] References Cited

U.S. PATENT DOCUMENTS

| Re. 16,104 | 6/1925 | Heymoss, Jr. | 168/28 |
|---|---|---|---|
| 777,022 | 12/1904 | Howell | 168/14 |
| 912,813 | 2/1909 | Cleary | 168/28 |
| 1,441,602 | 1/1923 | Robertson | 168/28 X |
| 3,957,120 | 5/1976 | Alletrux | 168/24 X |
| 4,253,526 | 3/1981 | Alletrux | 168/24 X |

FOREIGN PATENT DOCUMENTS

| 1589671 | 5/1970 | France . |
|---|---|---|
| 2262491 | 9/1975 | France . |
| 2411562 | 7/1979 | France . |
| 196149 | 5/1923 | United Kingdom . |

Primary Examiner—Robert P. Swiatek
Attorney, Agent, or Firm—Dennison, Meserole, Pollack & Scheiner

[57] ABSTRACT

Horseshoe comprising on a portion of its surface an extra thickness or rib (2) intended to bear on the ground and forming two branches (4) which are spaced apart sideways from each other rearwards. The remaining portion (1) of reduced thickness of the horseshoe extends beyond the branches of the rib, on the one hand, sideways and outwardly (6) and, on the other hand, sideways and inwardly (7), leaving a medial free space (42) between the two branches of the rib, and/or rearwards (8) so as to come in contact, after horseshoeing, both with the wall (52) and with the bars (53), the branches of the rib facing completely the sole (54).

15 Claims, 3 Drawing Sheets

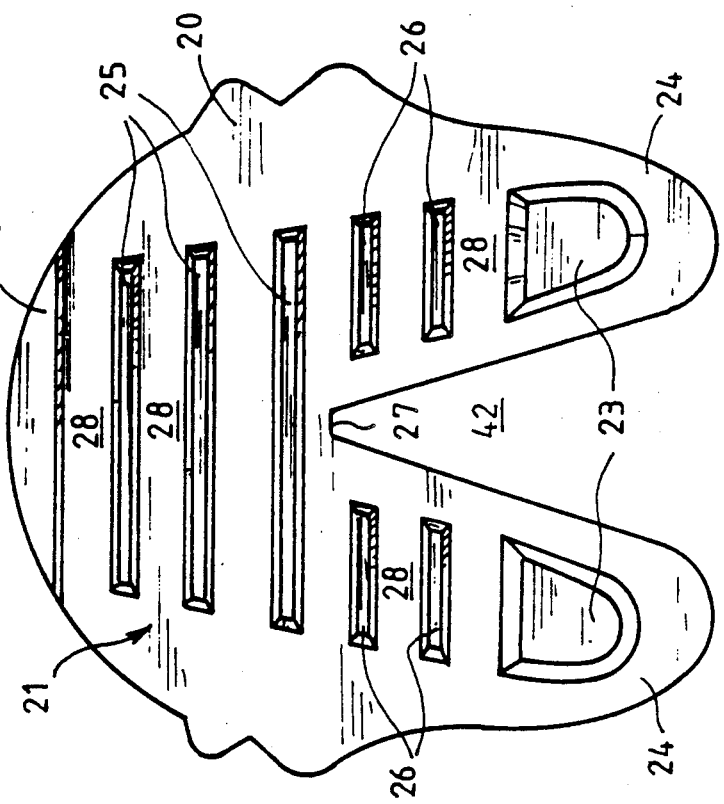
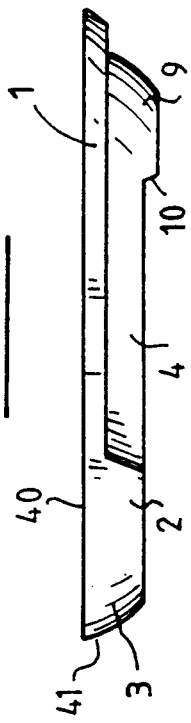
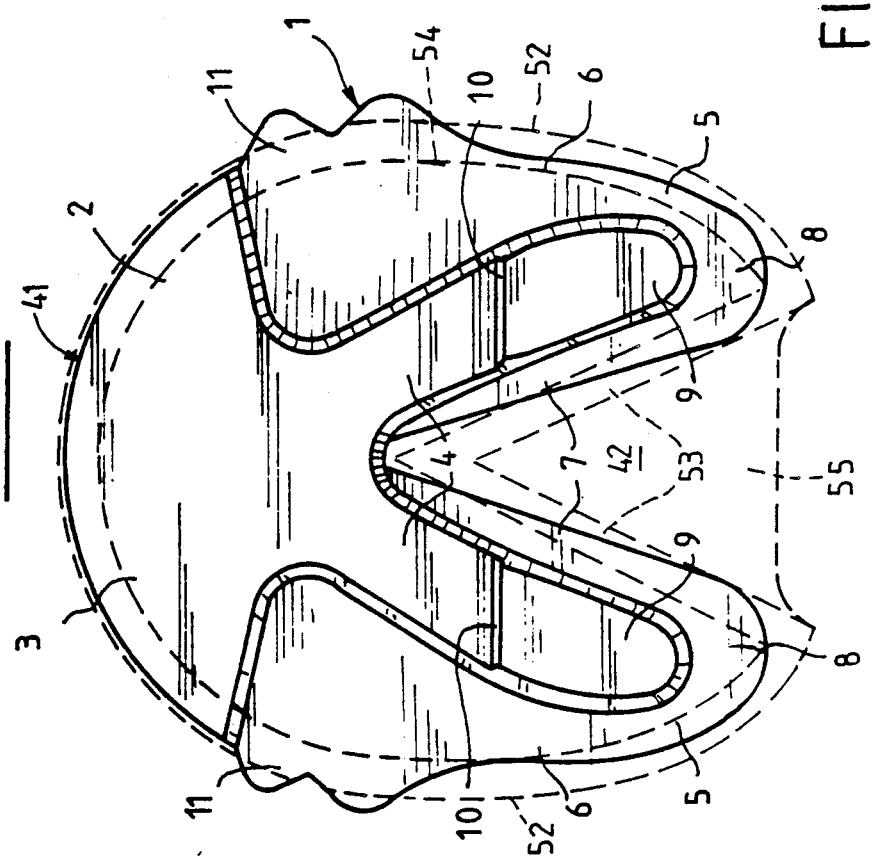

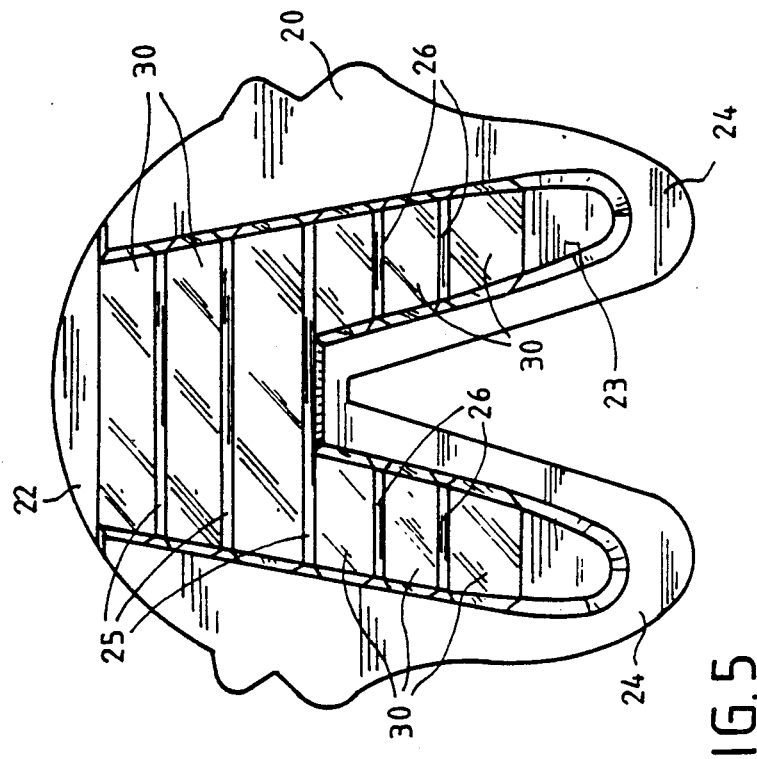
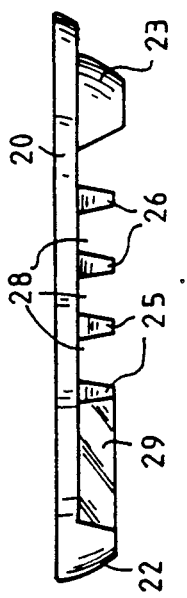
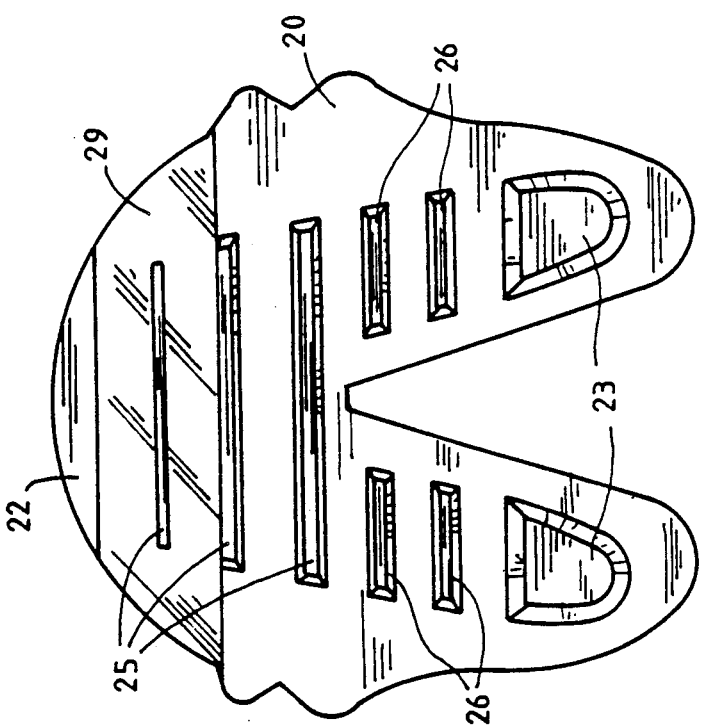

HORSESHOE

The invention concerns a horseshoe.

There is known from FR-A-2 262 491 a horseshoe having a substantially plane upper surface designed to come into contact, after horseshoeing, with the hoof of the horse and comprising on a portion of its surface an extra thickness or rib intended to bear on the ground, the horseshoe having over the remaining portion of its surface a reduced and substantially constant thickness, the rib forming two branches which diverge laterally from each other towards the rear.

This known horseshoe, like all those proposed until now, has to be forged to adapt it to the exact shape of the hoof to which it is to be fitted.

This forging operation requires lengthy and costly training of the farrier.

The objective of the invention is to eliminate the need for forging.

This objective is achieved, in accordance with the invention, in a horseshoe of the kind defined above, in that the reduced thickness portion of the horseshoe extends beyond the branches of the rib, on the one hand, sideways and outwardly and, on the other hand, sideways and inwardly, leaving a medial free space between the two branches of the rib, and/or rearwards so as to come into contact, after horseshoeing, both with the wall and with the bars, the branches of the rib facing completely the sole.

In a horseshoe of this kind the fact that only the thin portion comes into contact with the lateral regions of the wall and the bars, which are the rigid portions of the hoof surrounding the sole, enables the horseshoe to deform in use, its upper surface becoming convex to conform to the more flexible sole, so improving comfort and the stability of the contact between the horse and the ground. This favourable position can be obtained by adapting the horseshoe to the shape of the hoof by simple machining of the portion of the horseshoe whose thickness is small as compared with that of the remainder of the horseshoe comprising the rib.

The horseshoe in accordance with the invention is preferably made from aluminium alloy or a material with analogous properties. A horseshoe of this kind can be filed easily.

In one embodiment the posterior end portions of the branches of the rib are thicker than the remainder of the rib.

According to one characteristic of the invention, the rib has recesses in its lower surface the bottoms of which are substantially flush with the lower surface of the reduced thickness portion. In particular, it may be formed, over part of its length in the front-to-back direction, by separate transverse fins extending downward from the reduced thickness portion, preferably substantially perpendicular to the upper surface of the horseshoe.

The rib may have, forward of the fins, a solid portion the thickness of which is equal to the height of the fins and, to the rear of the fins, solid portions the thickness of which is greater than the height of the fins.

Alternatively, at least one recess in the rib may be delimited by a circular arc-shape surface crossing the central vertical plane of the horseshoe. In particular, the rib may have an arc-shaped forward portion adjacent the anterior edge of the horseshoe and separated from the remainder of the rib by an arc-shape recess.

The invention also provides for the rib to include at least one arc-shaped rear portion delimited towards the front by a recess, this rear portion possibly being of annular shape and surrounding another recess in the rib.

In a horseshoe with a rib in which there are recesses, the recesses may be at least partially filled with a material having anti-skid and/or shock-absorbing properties.

Also, the thickness of the rib may increase progressively from the front towards the back. In particular, the front end of the rib may form a rounded off section adjacent the forward edge of the upper surface of the horseshoe. A configuration of this kind anticipates the shape resulting from wear of the horseshoe in use and prevents the horse from stumbling when it puts its foot on the ground.

BRIEF DESCRIPTION OF THE DRAWINGS

Other characteristics and advantages of the invention will emerge from the description given hereinafter of a few embodiments and from the appended drawings in which:

FIGS. 1, 3, 4, 6 and 7 are bottom views of four horseshoes in accordance with the invention;

FIGS. 2 and 5 are lateral views of horseshoes in accordance with FIG. 1 and in accordance with FIG. 4, respectively;

DETAILED DESCRIPTION

Figure 7:
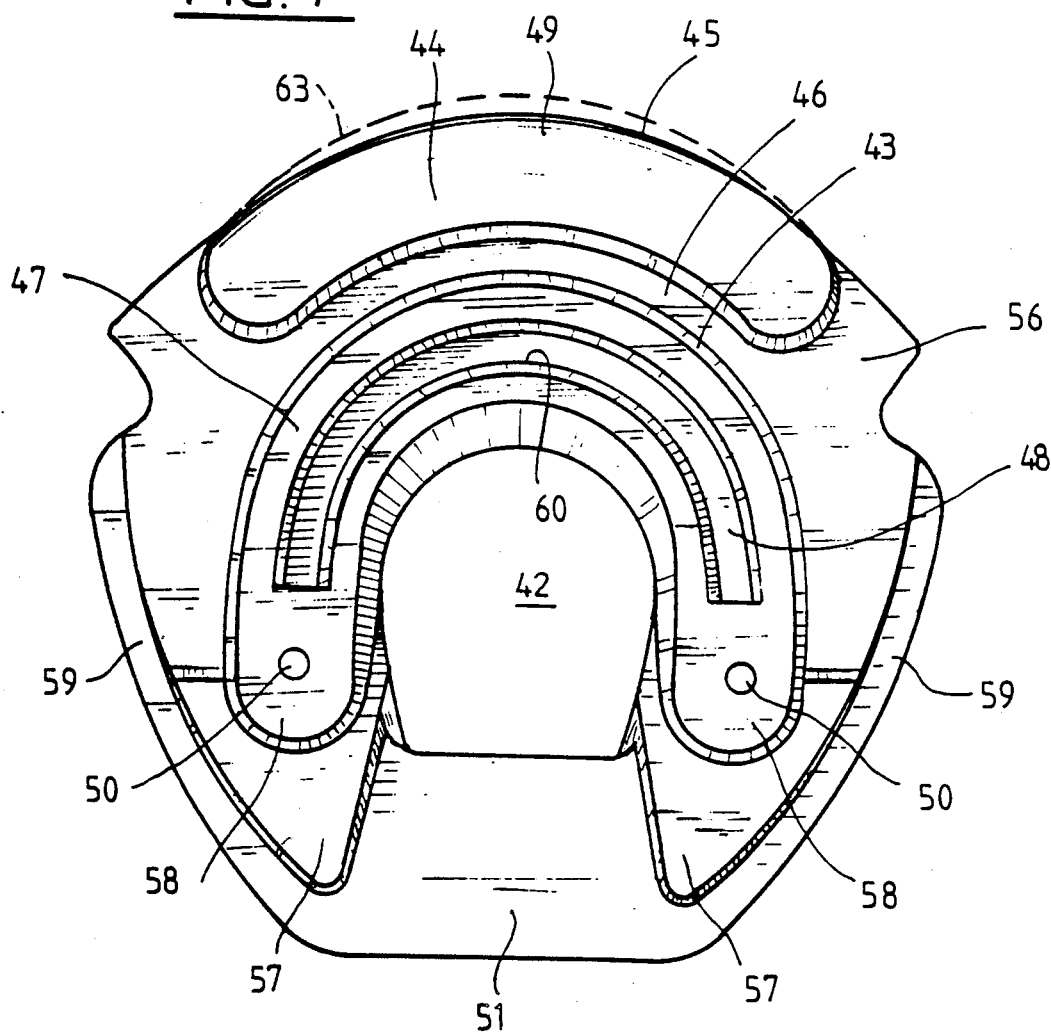

The horseshoe shown in FIGS. 1 and 3 is made from aluminium alloy (AG3T, for example) and is in the general shape of the letter V with a rounded bottom.

The horseshoe has a substantially plane surface 40 designed to come into contact with the foot of the horse. It comprises on a portion of its surface an extra thickness or rib 2 intended to bear on the ground and has over its remaining portion 1 a reduced, substantially uniform thickness in the order of 5 mm.

The shape of the rib 2 resembles a mushroom with two stalks, the cap 3 of the mushroom corresponding to the rounded base of the V and the stalks 4 of the mushroom forming the branches which diverge laterally from each other towards the back of the horseshoe. It is seen that the reduced thickness portion 1 extends laterally beyond the branches 4 of the rib, both outwardly at 6 and inwardly, that is to say in the direction from one branch towards the other, at 7. The portion 1 also extends at 8 beyond the posterior ends of the branches 4 of the rib.

The total thickness of the horseshoe is in the order of 15 mm, this thickness being slightly greater in line with the posterior end portions 9 of the branches 4 of the rib, which end portions merge with the remainder of the rib through shoulders 10.

Toe-clips 11 are provided on the sides of the horseshoe.

The reduced thickness areas 6, 7 and 8 enable the horseshoe to be adapted to the exact shape of the foot of the horse by removing material with a thickness that is reduced as compared with the total thickness of the horseshoe.

The horseshoe is fixed to the hoof of the horse by nails passing through holes or nail-holes formed at appropriate places in the reduced thickness portion. Conventional nails or special flat-head nails may be used.

Because of the deformability of the alloy from which the horseshoe is made, the platform deforms in use to match the lower surface of the foot of the horse. The shape of the rib and its varying thickness ensure a good grip on the ground.

There is shown in dashed outline in FIG. 1 the lower end of the wall 52 and the bars 53 as they appear after horseshoeing, the wall and the bars constituting the rigid portion of the hoof which surrounds the sole 54. Also seen is the fork 55, another flexible region of the hoof situated inside the V formed by the bars 53.

It can be seen in FIG. 1 that the branches 4, which are separated laterally from each other by a central gap, face completely the sole 54. They therefore do not prevent deformation of the horseshoe to enable this upper surface 40 to curve upwardly and come into contact with the sole. To ensure a firm seating of the horseshoe on the foot, the forward area of the cap 3 of the rib, adjacent the forward edge 41 of the horseshoe, the outside lateral reduced thickness area 6 and the posterior reduced thickness area 8 come to bear against the wall whereas the same area 8 and the inside lateral reduced thickness area 7 bear on the bars. If necessary, depending on the exact shape of the hoof, it is possible to file away part of the reduced thickness areas 6 and/or 7 and/or 8. The free space 42 situated between the reduced thickness areas 7 faces the fork 55.

The horseshoe of FIG. 3 has a similar contour to the horseshoe of FIGS. 1 and 2 and has a discontinuous rib 21 the contour of which is that of a V with a wide base and substantially rectilinear branches with rounded free ends. The rib 21 comprises a solid portion 22 situated at the front of the horseshoe, two heelpieces 23 situated near its rear edge and fins 25 and 26 situated between the forward portion 22 and the heelpieces 23 and extending transversely, parallel to each other. Three ribs 25 are situated forward of the branches of the rib and two pairs of fins 26 constitute with the heelpieces 23 the branches of the rib, the fins 26 of one of the branches being aligned with respective fins 26 of the other branch. The portions 22 and 23 and the fins 25 and 26 are separated from each other, in the longitudinal direction of the horseshoe, by recesses or grooves 28 the bottoms of which are flush with the lower surface of the reduced thickness portion 20 of the horseshoe.

The profile of the fins 25 and 26 is visible in FIG. 5, which shows a composite horseshoe comprising a cast portion identical to the horseshoe from FIG. 3. This profile is trapezoidal, the median plane of the fins being perpendicular to the plane upper surface of the horseshoe.

The thickness of the forward portion 22 of the rib is equal to the height of the fins 25 and 26 and corresponds substantially to the thickness of the anterior portion of the rib of the horseshoe from FIGS. 1 and 2. The thickness of the heelpieces 23 is greater than the height of the fins and corresponds substantially to the thickness of the rear portions 9 of the previous embodiment. The recesses 28 lighten the horseshoe without reducing its stiffness.

The reduced thickness portion 20, like that of the horseshoe previously described, extends beyond the rib laterally, outwards and inwards, leaving a medial free space 42, and towards the rear.

The horseshoe of FIGS. 4 and 5 is formed by a metal armature identical to the horseshoe of FIG. 3, the component parts of which are designated by the same reference numbers, and a mass 29 overmoulded onto this armature. The mass 29 is of a plastics or elastomer material with anti-skid and shock-absorbing properties. It further improves the grip of the horseshoe on the ground. Its thickness is equal to the height of the fins 25. It fills the recess 28 (FIG. 3) adjacent the forward portion 22 of the rib and that between the first two fins 25, and extends laterally to the edges of the horseshoe.

FIG. 6 relates to an alternative embodiment which differs from the subject of FIGS. 4 and 5 only in that the mass 29 is replaced by a mass 30 of the same kind which fills all the recesses 28 and does not extend beyond the V-shaped contour of the rib. The mass 30 is therefore formed from as many separate elements as the rib 21 comprises recesses.

Figure 8:
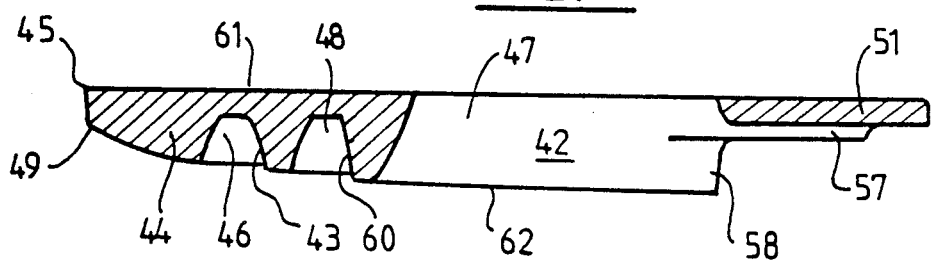
FIG. 8 is a view in longitudinal cross-section of the horseshoe from FIG. 7.

The horseshoe of FIGS. 7 and 8 comprises a rib made up of two portions 44 and 47 separated by a recess 46. The portion 44 is crescent-shaped with rounded ends and extends along the anterior edge 45 of the horseshoe. The portion 47, situated to the rear relative to the portion 44, is in the shape of a U with the branches facing towards the rear. The portion 56 of the horseshoe not covered by the rib once again has a reduced thickness in the order of 5 mm, this thickness being slightly increased in areas 57 adjacent the rear ends 58 of the branches of the rib and slightly decreased in exterior marginal areas 59 extending over almost the rear half of the length of the horseshoe, in order to achieve an optimum compromise between stiffness, lightness and easy machining of the horseshoe. Also, the portions of the horseshoe situated to the rear of the ends 58 of the branches of the rib, or calkins, are joined to each other by a crossmember 51 having the same thickness as the areas 59. The crossmember 51 confers on the horseshoe an annular configuration surrounding a medial free space 42. A crossmember of this kind is useful for a horse foot having certain morphological characteristics.

The rib portion 47 has an annular configuration and surrounds a U-shaped recess 48. The bottoms of the recesses 46 and 48 are flush with the lower surface of the reduced thickness portion 56 of the horseshoe. The rib portion 47 is delimited towards the front by a convex arc-shaped surface 43 adjacent the arc-shaped recess 46. Likewise, a convex surface 60 of the rib delimits the recess 48 towards the rear. These convex surfaces improve the resistance of the rib to deformation when the horseshoe comes into contact with the ground.

FIG. 8 shows that the thickness of the rib increases progressively from the front towards the rear. At the front a rounded section 49 joins the forward edge 45 of the plane upper surface 61 of the horseshoe to the lower surface 62 of the rib. The thickness of the horseshoe increases rapidly at the level of this rounded section and then increases more slowly to stabilise at a value in the order of 15 mm in the rear portion of the branches of the rib. In this rear portion, to the rear of the ends of the recess 28, starter holes 50 are formed in the surface 62 for fitting crampons either directly or through the intermediary of inserts.

Changes of detail may be made to the embodiments described without departing from the scope of the invention. Thus the horseshoe may have a solid rib with a V-shaped contour similar to that of the rib with recesses of FIGS. 3 through 6.

The shoulders 10 delimiting towards the front the thick portions 9 of the rib in FIGS. 1 and 2 and the anterior surfaces of the heelpieces 23 of FIGS. 3 et seq may, instead of being substantially plane as shown, have a convex curvature and merge without sharp edges with the lateral surfaces of these thick portions or these heelpieces.

The reduced thickness portion of each horseshoe may extend a little towards the front beyond the rib, as shown in dashed outline at 63 in FIG. 7, to be folded over onto the front surface of the wall in the same way as the toe-clips are folded against the side surfaces.

The characteristics imparted to the various horseshoes described may be combined with each other. Thus an anti-skid and/or shock-absorbing mass analogous to that of FIGS. 4 through 6 may be provided in the recesses 46 and 48 of FIGS. 7 and 8. The crossmember 51 of the horseshoe from these figures may be eliminated, and an analogous crossmember may be added to the other horseshoes.

What is claimed is:

1. A monolithic one-piece horseshoe of a deformable alloy having a substantially plain upper surface (40) intended to come into contact, after horseshoeing with the bars and wall of the hoof of the horse and comprising on a portion of its surface an extra thickness or rib (2) intended to bear on the ground, the horseshoe having over the remaining portion (1) of its surface a reduced, substantially constant thickness which extends outwardly of the rib about the periphery of the horseshoe, the rib forming two branches (4) which diverge sideways from each other rearwards, characterized in that the reduced thickness portion (1) of the horseshoe extends beyond the branches of the rib sideways and outwardly (6) and sideways and inwardly (7), and rearwardly (8) beyond the posterior ends of the side branches leaving a medial free space (42) between the two branches of the rib, so as to come into contact, after horseshoeing, both with the wall and with the bars, the upper surface of the branches of the rib contacting the sole of the hoof.

2. Horseshoe according to claim 1, characterised in that it has an annular shape and comprises a crossmember (51) at the rear of the medial free space.

3. Horseshoe according to claim 1, characterised in that the posterior end portions (9) of the branches (4) of the rib are thicker than the remainder of the rib.

4. Horseshoe according to claim 1, characterised in that the rib has recesses (28) in its lower surface the bottoms of which are substantially flush with the lower surface of the reduced thickness portion.

5. Horseshoe according to claim 4, characterised in that the rib is formed, over a portion of its length in the front-to-back direction, by separate transverse fins (25, 26) extending downwards from the reduced thickness portion.

6. Horseshoe according to claim 5, characterised in that the fins are substantially perpendicular to the upper surface (40).

7. Horseshoe according to claim 5, characterised in that the rib has forward of the fins a solid portion (22) the thickness of which is equal to the height of the fins and to the rear of the fins solid portions (23), the thickness of which is greater than the height of the fins.

8. Horseshoe according to claim 4, characterised in that at least one recess in the rib (44, 47) is delimited by an arc-shaped surface (43) crossing the median vertical plane of the horseshoe.

9. Horseshoe according to claim 8, characterised in that the rib comprises an arc-shaped front portion (44) adjacent to the anterior edge (45) of the horseshoe and separated from the remainder of the rib by an arc-shaped recess (46).

10. Horseshoe according to claim 8, characterised in that the rib comprises at least one arc-shaped rear portion (47) delimited towards the front by a recess (46).

11. Horseshoe according to claim 1, characterised in that the thickness of the rib increases progressively from the front towards the back.

12. Horseshoe according to claim 11, characterised in that the forward end of the rib forms a rounded section (49) adjacent the forward edge of the upper surface (40) of the shoe.

13. Horseshoe according to claim 1, characterised in that starter holes (50) are provided in the lower surface (62) of the rib for fitting crampons.

14. Horseshoe having a substantially plain upper surface (40) intended to come into contact, after horseshoeing, with the bars and wall of the hoof of the horse and comprising on a portion of its surface an extra thickness or rib (2) intended to bear on the ground, the horseshoe having over the remaining portion (1) of its surface a reduced, substantially constant thickness which extends outwardly over the ribs about the periphery of the horseshoe, the rib forming two branches (4) which diverge sideways from each other rearwards, characterized in that the reduced thickness portion (1) of the horseshoe extends beyond the branches of the rib sideways and outwardly (6) and sideways and inwardly (7), leaving a medial free space (42) between the two branches of the rib, and rearwards so as to come into contact, after horseshoeing, both with the wall and with the bars, the upper surface of the branches of the rib contacting the sole of the hoof, the rib having recesses (28) in its lower surface the bottoms of which are substantially flush with the lower surface of the reduced thickness portion, at least one recess in the rib (44, 47) is delimited by an arc-shaped surface (43) crossing the median vertical plane of the horseshoe, the rib comprising at least one arc-shaped rear portion (47) delimited towards the front by a recess (46), said at least one arc-shaped rear portion being annular and surrounding a recess (48) in the rib.

15. Horseshoe having a substantially plain upper surface (40) intended to come into contact, after horseshoeing, with the bars and wall of the hoof of the horse and comprising on a portion of its surface an extra thickness or rib (2) intended to bear on the ground, the horseshoe having over the remaining portion (1) of its surface a reduced substantially constant thickness which extends outwardly of the rib about the periphery of the horseshoe, the rib forming two branches (4) which diverge sideways from each other rearwards, characterized in that the reduced thickness portion (1) of the horseshoe extends beyond the branches of the rib sideways and outwardly (6) and sideways and inwardly (7) leaving a medial free space (42) between the two branches of the rib, and rearwardly so as to come into contact, after horseshoeing, both with the wall and with the bars, the upper surface of the branches of the rib contacting the sole of the hoof, the rib having recesses (28) in its lower surface the bottoms of which are substantially flush with the lower surface of the reduced thickness portion, and the recesses in the rib being at least partially filled with a material (29) having anti-skid and/or shock-absorbing properties.

* * * * *